US012656240B2

(12) United States Patent　(10) Patent No.: US 12,656,240 B2
Pinto Pamplona　(45) Date of Patent: Jun. 16, 2026

(54) REMOTE CORROSION MONITORING SYSTEM

(71) Applicant: PETRÓLEO BRASILEIRO S.A.—PETROBRAS, Rio de Janeiro (BR)

(72) Inventor: Heraldo Raimundo Pinto Pamplona, Macaé (BR)

(73) Assignee: PETRÓLEO BRASILEIRO S.A.—PETROBRAS, Rio de Janeiro (BR)

( * ) Notice: Subject to any disclaimer, the term of this patent is extended or adjusted under 35 U.S.C. 154(b) by 210 days.

(21) Appl. No.: 18/256,887

(22) PCT Filed: Nov. 25, 2021

(86) PCT No.: PCT/BR2021/050515
　§ 371 (c)(1),
　(2) Date: Jun. 9, 2023

(87) PCT Pub. No.: WO2022/120448
　PCT Pub. Date: Jun. 16, 2022

(65) Prior Publication Data
　US 2024/0019355 A1　Jan. 18, 2024

(30) Foreign Application Priority Data
　Dec. 11, 2020　(BR) ...................... 10 2020 025457 0

(51) Int. Cl.
　*G01N 17/02*　(2006.01)
　*G01N 17/00*　(2006.01)
(52) U.S. Cl.
　CPC ........... *G01N 17/02* (2013.01); *G01N 17/006* (2013.01)

(58) Field of Classification Search
　CPC ....... G01N 17/02; G01N 17/006; G01N 27/30
　See application file for complete search history.

(56) References Cited

U.S. PATENT DOCUMENTS 5,306,414 A　4/1994　Glass et al.
5,792,337 A　8/1998　Padovani et al.
(Continued)

FOREIGN PATENT DOCUMENTS

BR　PI0620481　11/2011
CN　101430271　5/2009
(Continued)

OTHER PUBLICATIONS

Chen et al., CN201910267U, English translation, 2019 (Year: 2019).*
(Continued)

*Primary Examiner* — Shizhi Qian
(74) *Attorney, Agent, or Firm* — Knobbe, Martens, Olson & Bear, LLP

(57) ABSTRACT

The present invention addresses to a Corrosion Remote Monitoring System (CRMS) for integral application in the inspection of metallic structures, located in environments with high humidity index (TVZ), aiming at protecting the pipings from the action of external corrosion in the oil and gas industry segment, as it is of great importance for the preservation of the structural integrity of the installations, operational safety and preservation of the environment, in this last aspect, for preventing hydrocarbon leaks at sea. The installation of the Corrosion Detection System (CDS) in any Production Unit (PU) does not require any type of adaptation and additional space, and can be implemented in offshore units.

7 Claims, 7 Drawing Sheets

(56) References Cited

U.S. PATENT DOCUMENTS

| | | | |
|---|---|---|---|
| 10,031,066 B1 * | 7/2018 | Brown | G01N 17/02 |
| 2002/0105346 A1 * | 8/2002 | Banks | G01N 17/02 |
| | | | 324/700 |
| 2003/0189435 A1 | 10/2003 | Yunovich et al. | |
| 2005/0145018 A1 | 7/2005 | Sabata et al. | |
| 2007/0159187 A1 * | 7/2007 | Chen | G01N 17/04 |
| | | | 324/700 |
| 2009/0195260 A1 * | 8/2009 | Bell | G01N 17/04 |
| | | | 324/700 |
| 2015/0129431 A1 * | 5/2015 | Winther-Jensen | |
| | | | H01M 4/8605 |
| | | | 205/630 |
| 2015/0198519 A1 | 7/2015 | Smyrl | |
| 2016/0139030 A1 * | 5/2016 | Jovancicevic | G01N 17/02 |
| | | | 324/700 |
| 2020/0232904 A1 * | 7/2020 | Wendeler-Goeggelmann | |
| | | | G01N 17/04 |
| 2021/0356385 A1 * | 11/2021 | Shah | G08B 21/182 |

FOREIGN PATENT DOCUMENTS

| | | | | | |
|---|---|---|---|---|---|
| CN | 101857957 | A | * | 10/2010 | |
| CN | 201910267 | U | * | 7/2011 | |
| CN | 108828329 | A | * | 11/2018 | G01R 29/0878 |
| KR | 101049691 | | | 7/2011 | |
| WO | WO 00/50907 | | | 8/2000 | |
| WO | WO2000045148 | A1 | * | 8/2000 | |

OTHER PUBLICATIONS

International Search Report and Written Opinion dated Jun. 16, 2022, in International Application No. PCT/BR2021/050515.

* cited by examiner

REMOTE CORROSION MONITORING SYSTEM

FIELD OF THE INVENTION

The invention addresses to a Corrosion Remote Monitoring System (CRMS) with application in the field of inspection technologies, materials, equipment, and corrosion in production units aiming at optimizing the maintenance and inspection practices of pipelines located in the tidal variation zone (TVZ) and, consequently, significant savings of financial resources.

DESCRIPTION OF THE STATE OF THE ART

Currently, the maintenance and inspection technique used dates back to the 70s, when there were a small number of pipelines to be evaluated. The productivity of the used technique is low, the functional risk of the workforce is high, such as scaffolding and climbing, and the operating cost is high. Furthermore, interventions can only be carried out in a short period of the year when weather conditions are favorable.

The inspection mainly aims at identifying areas where the loss of thickness of the pipeline wall is significant, due to the external corrosion, jeopardizing the production process.

The inspection method consists of (1) removing the anti-corrosion external coating, (2) preparing the surface of the pipeline in the almost white metal pattern, (3) mapping and measuring the remaining thickness, with ultrasound, of the wall of the corroded area and, finally, (4) perform the repair with an anti-corrosion composite material, to ensure the operational continuity of the piping. The access to the workplace (TVZ) is via fixed scaffolding or with climbers, the operator suspended from ropes, subject to bad weather, strong winds and rough seas, factors that impede good productivity in operations. The risk of accidents is high. There are records of fatal accidents with fixed scaffolding.

The tools used are mechanical and hydraulic equipment that require good stability from operators to perform the work, a fact difficult to achieve with the climbing technique. The productivity is low.

This work evaluates the integrity of the pipeline, following the Technical Inspection Recommendations (TIR) for the correction of detected nonconformities. Depending on the characteristics of the damage, a specific repair is recommended—split clamp, double welded rails, mechanical connector, structural reinforcement with composite material and anti-corrosion protection. In the case of a repair carried out with a composite material, the expiration date of the repair is randomly defined. After the expiration date, a new inspection is requested to guarantee the integrity of the pipeline. This fact jeopardizes the carrying out of the annual inspection schedule, as it prioritizes the service of revalidation of repairs.

This inspection procedure is the same as in the 70s, when there were few pipelines to be inspected. This inspection paradigm is mainly responsible for the failure to fully comply with the inspection program advocated today.

Nowadays, the inspection program includes 95 pipelines distributed across the Campos, Espirito Santo and Santos basins. With the available resources, the defined goal is not met, always remaining a repressed demand, which poses a risk to the integrity of the piping.

This situation leaves companies vulnerable to sanctions by the Brazilian Navy, IBAMA—Brazilian Institute for the Environment and Renewable Natural Resources and the ANP (National Agency for Petroleum, Natural Gas and Biofuels), the latter, for not having complied with the explicit recommendations of the Operational Safety System of the Subsea System (SGSS). No less worrying are the records shown in the GIDES—Subsea Pipeline and Equipment Integrity Management-, which indicate 951 registered risers, in the three basins, by June 2017. The trend for this number is to increase with the installation of new units.

Within this scenario, the need arises to find some other inspection technique capable of meeting the following premises: (1) minimizing the operational risks of the workforce, (2) avoiding repetitive inspections for revalidation of repairs, and, finally, (3) having low operating costs. The corrosive process, if neglected, is a constant threat to the integrity of installations, occupational health and preservation of the environment, due to the risk of undesirable leaks.

Document WO0050907 discloses a sensor device to record voltage drops in structures exposed to corrosion, such as pipes and supports, in offshore environments. The sensors are coupled to a surface area, to which voltage is supplied via electrodes, causing an excitation current in the area. The cables are connected to said sensors, arranged in a matrix that defines measurement points with defined distances, to transmit material thickness and/or structural defects (erosion, corrosion and others) in the measurement area. Such a sensing device comprises a flexible sheet of a non-conducting electrical material in which conductive paths are incorporated, leading to several distributed and exposed measuring points, encompassing a hinged chain to which individual contact joints are connected by means of connection pins, each contact joint holding at least one, preferably two contact pins, under stress by a coil spring. However, said sensor device does not focus on optimizing maintenance and inspection practices of pipelines in the TVZ (tidal variation zone) based on the operation of the electrochemical cell or Daniell cell.

Patent CN101430271 discloses a device for monitoring metal corrosion, in particular a device for monitoring metal corrosion under an organic coating and a method for monitoring the same. The device comprises an electrolytic cell cover, a barrel made of the same material as the metallic material to be monitored, a nickel bar and a socket connector. However, the system does not have components such as a conductor cable connected to the galvanic cell and LED, nor does it have a specimen configured with all the parameters of the galvanic cell.

Document U55306414 discloses a set of corrosion sensors that incorporate individual elements to measure various elements and ions, and elements to evaluate the flash corrosion properties of structural materials. The exact combination and number of elements measured or monitored would depend on the environmental conditions and materials used which are subject to corrosive effects. Such a corrosion monitoring system incorporated or mounted in a structure exposed to the environment would serve as an early warning system for the appearance of serious corrosion problems in the structure, providing both a safety factor and economic factors. The set of sensors is accessed by an electronic/computer system, which provides a means of data collection and analysis. However, this system does not claim a specimen configured with all the parameters of the galvanic cell, nor does it mention components such as a conductor cable connected to the galvanic cell and LED.

No document of the state of the art discloses a system for detecting external corrosion in steel pipings such as that of the present invention.

Thus, the present invention was developed with a disruptive technology that allows monitoring, in real time, on the platform deck, the corrosive process acting in specific areas of the piping, the main focus of inspection programs.

The invention mainly aims at reducing the number of pipelines to be inspected, addressing only to the pipelines with indication of corrosion detected by the Corrosion Detection System (CDS).

The present invention fills an important gap in the field of inspection and maintenance of pipelines located in the TVZ, due to the following advantages:

1—Any quantity of pipelines can be simultaneously monitored;

2—It significantly reduces the number of pipelines to be inspected, where only pipelines with signs of corrosion, evidenced by the CDS, will be inspected;

3—It reduces the number of teams mobilized for inspection;

4—It reduces the cost of logistical support due to the smaller number of transfers of teams and materials;

5—It reduces consumption of material used in maintenance;

6—It reduces the number of interventions to meet Inspection Treatment Recommendations (ITRs);

7—It provides better conditions for planning intervention schedules;

8—It eliminates inspection rework on expired expiration dates;

9—It minimizes climbers' risks due to the reduction in the number of interventions;

10—It eliminates the risk of oil leakage at sea due to the prior indication of the weakened section of the piping.

BRIEF DESCRIPTION OF THE INVENTION

The present invention addresses to a Corrosion Remote Monitoring System (CRMS) with application in the field of inspection technologies, materials, equipment and corrosion aiming at optimizing the maintenance and inspection practices of pipelines located in the tidal variation zone (TVZ).

The present invention was conceived for the integral application in the inspection of metallic structures, located in environments with high humidity index (TVZ), aiming at protecting the pipings from the action of external corrosion in the oil and gas industry segment, as it is of great importance for the preservation of the structural integrity of the installations, operational safety and preservation of the environment, in the latter aspect, for preventing oil spills at sea. The installation of the Corrosion Detection System (CDS) in any Production Unit (PU) does not require any type of adaptation and additional space, and can be implemented in offshore units.

BRIEF DESCRIPTION OF THE DRAWINGS

The present invention will be described in more detail below, with reference to the attached figures which, in a schematic way and not limiting the inventive scope, represent examples of its embodiment. In the drawings, there are.

4

Figure 4:
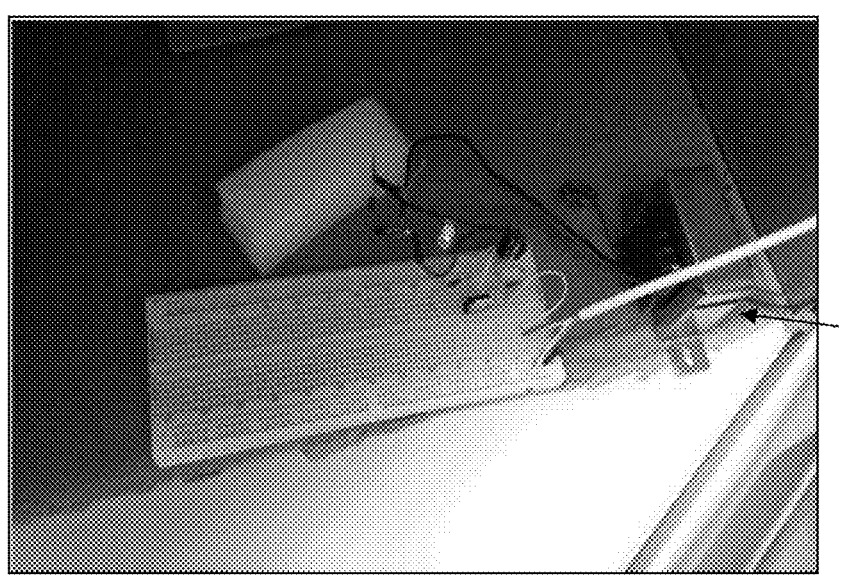
Figure 5:
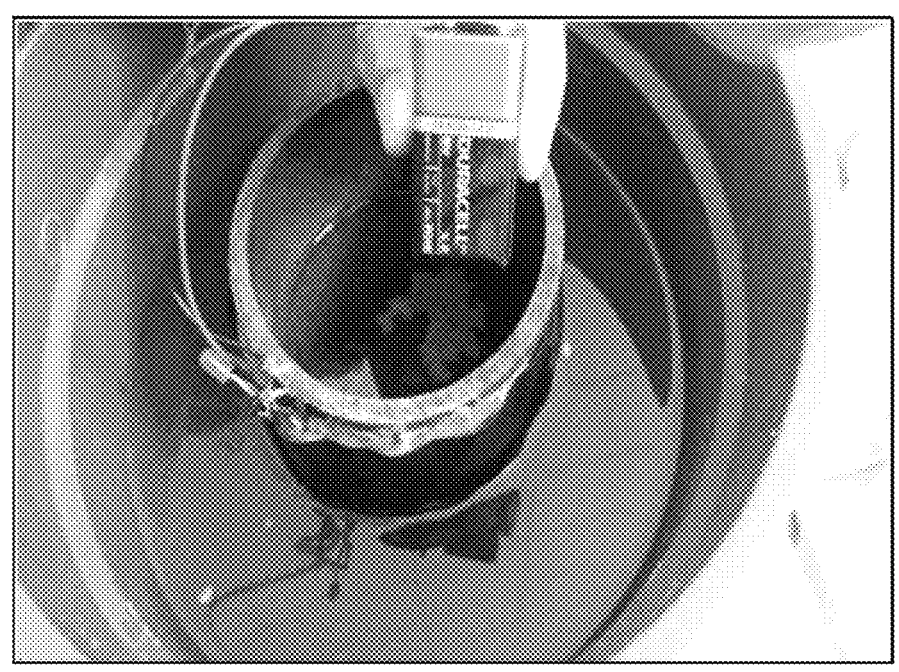
Figure 6:
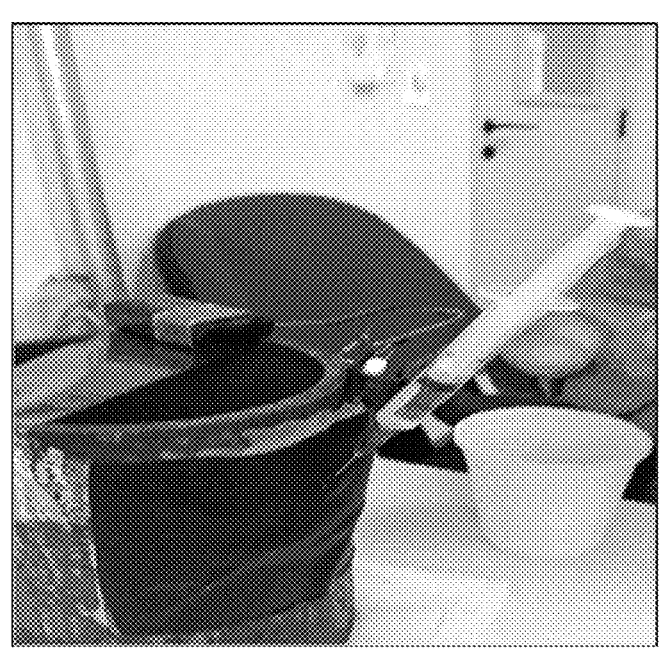
Figure 7:
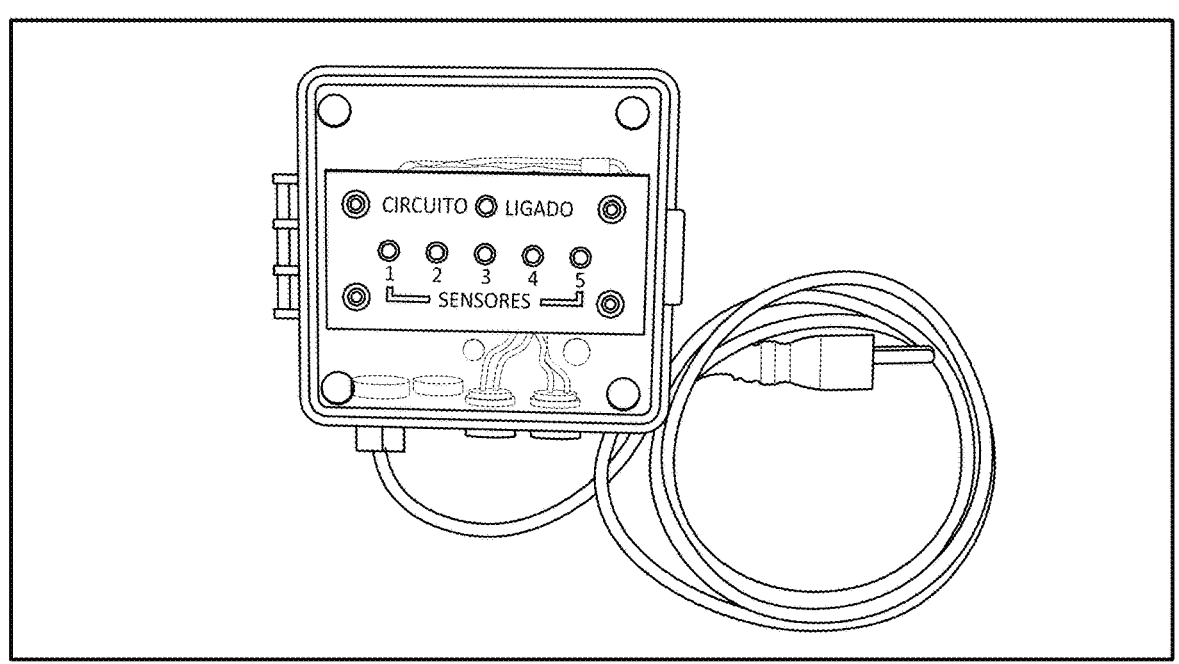
Figure 8:
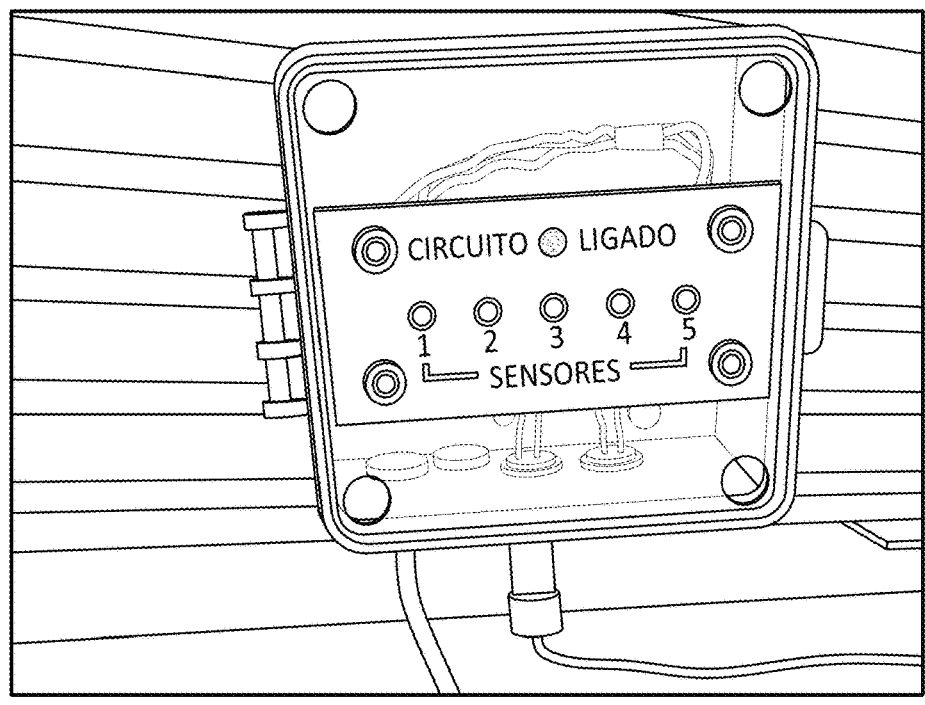
Figure 9:
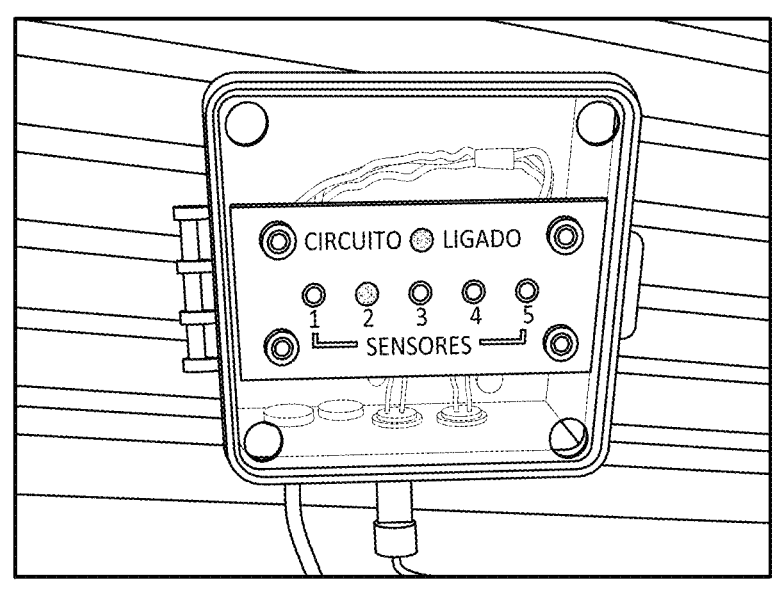
Figure 10:
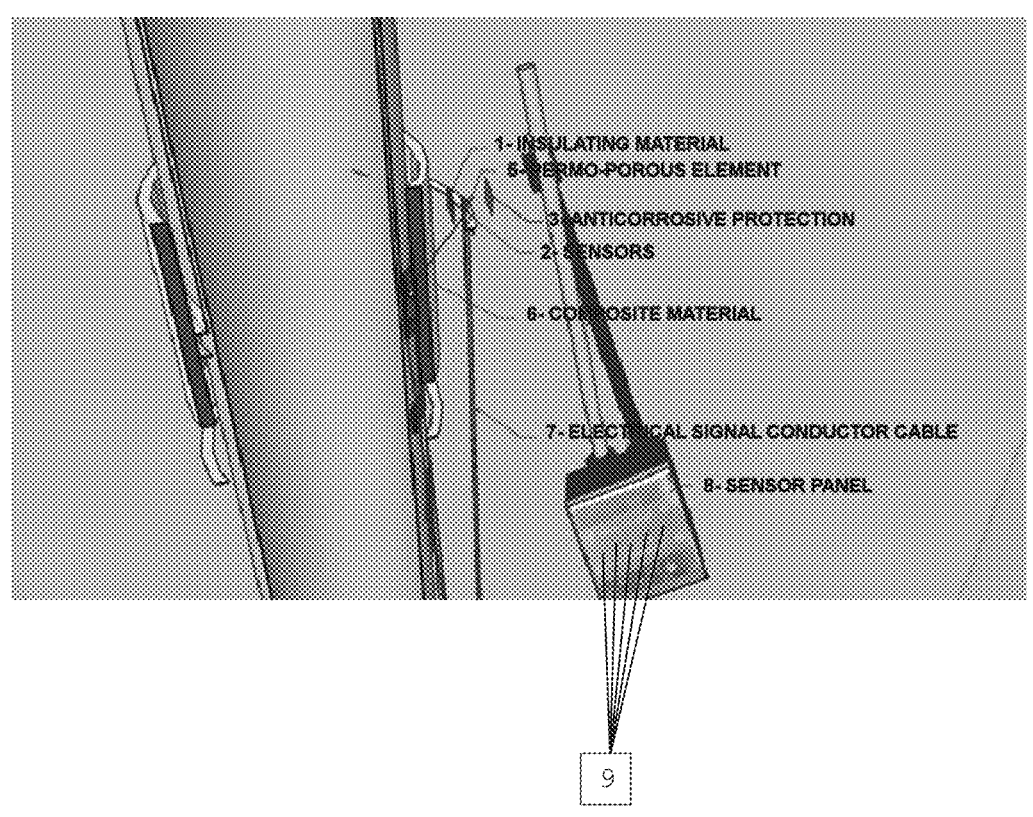
Figure 11:
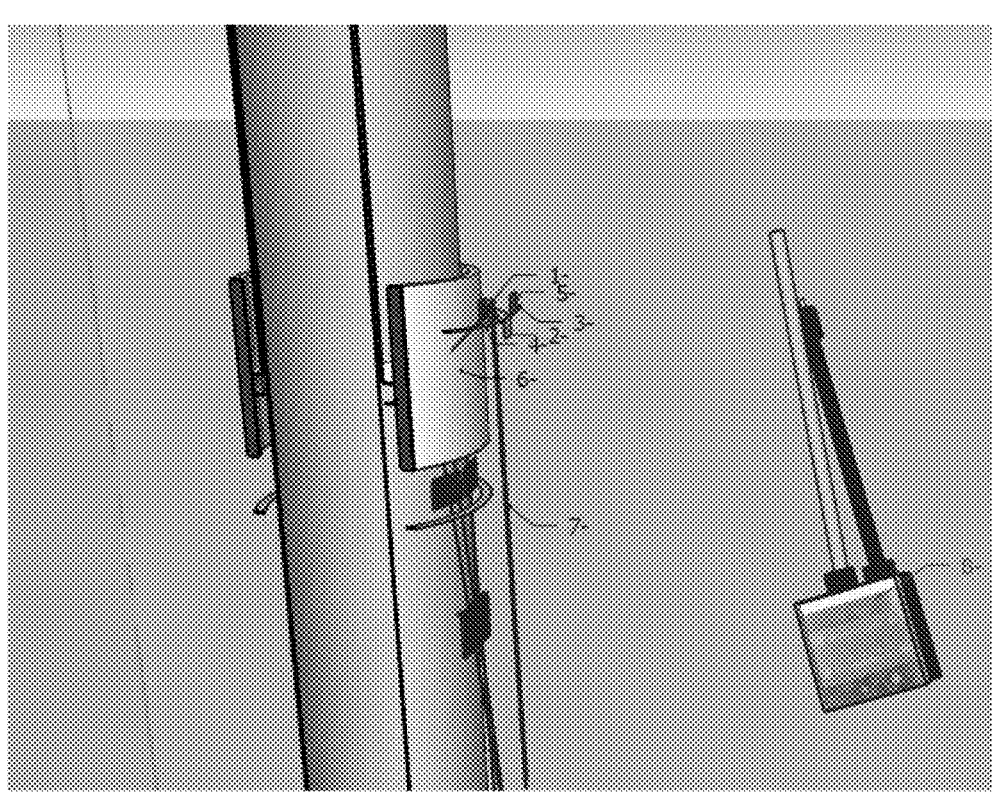
Figure 12:
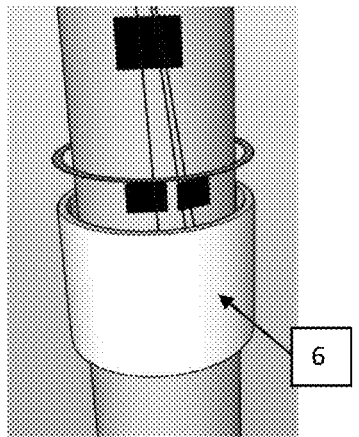
Figure 13:
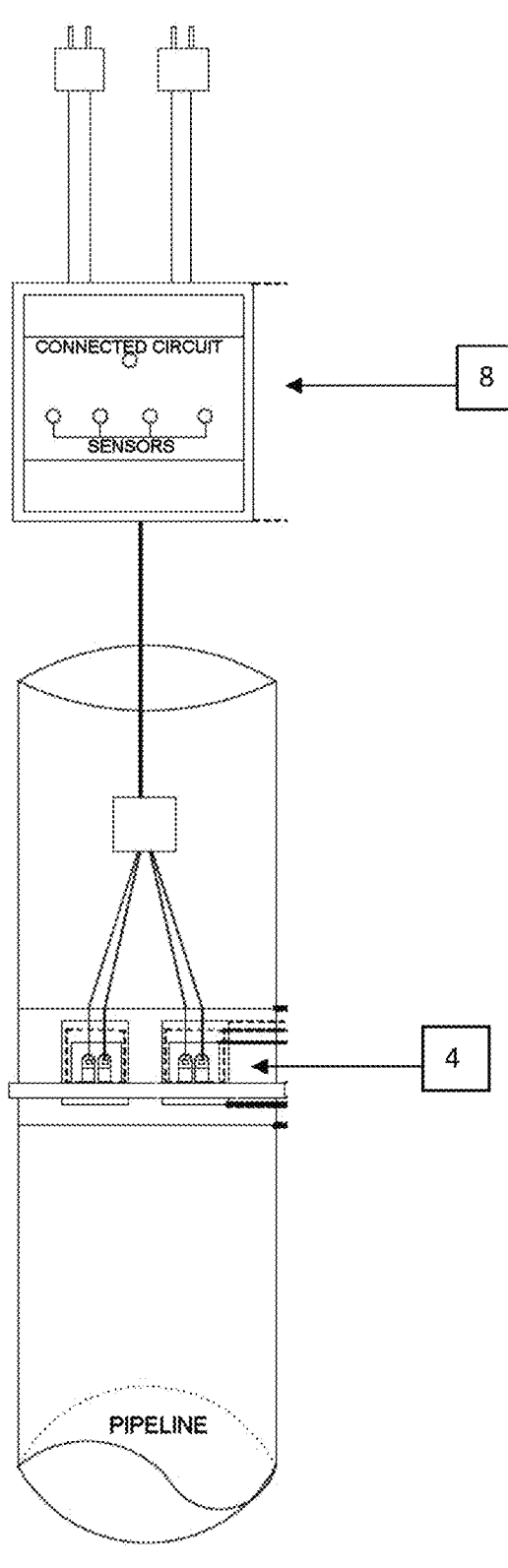

FIG. 4 illustrating a protoboard with the system components, energized with 127 V, consisting of a conductor cable (white) connected to a galvanic cell (sensor) and the LED on, indicating the detection of a voltage of 0.75 V;

FIG. 5 illustrating a CP with all the system components and immersed in a container containing salt water, for 72 hours, simulating the TVZ environment;

FIG. 6 illustrating the induction of sodium chloride saline solution in the corrosion detection system (CDS);

FIG. 7 illustrating the electronic panel turned off to receive the signal from a set of five sensors;

FIG. 8 illustrating the electronic panel powered up (LED on);

FIG. 9 illustrating the electronic panel energized (LED on) indicating the beginning of corrosion in one of the sensors;

FIG. 10 shows in details the applied invention, where (1) insulating element, (2) sensors, (3) anti-corrosion protection, (5) permo-porous element, (6) composite material, (7) electrical signal conductor cable and (8) sensor panel;

FIG. 11 shows in detail the applied invention, where (1) insulating element, (2) sensors, (3) anti-corrosion protection, (4) sensor collar, (5) permo-porous element, (6) composite material, (7) electrical signal conductor cable and (8) sensor panel;

FIG. 12 shows the layer of composite material (6) that is applied;

FIG. 13 illustrates the wiring diagram of the sensors (4) with the electronic panel (8).

DETAILED DESCRIPTION OF THE INVENTION

The present invention relates to a system to monitor the corrosive process acting in the pipelines located in the tidal variation zone (TVZ), wherein with this system is possible to monitor, on the deck of the Production Unit (PU), the action of corrosion at any point of the risers, J-Tubes and I-Tubes installed in the PUs.

The Corrosion Detection System (CDS) according to the present invention and illustrated in FIG. 10 comprises an electrical source, an electronic panel (8) with five electrical sensors (9) with LED connected to the cable conductor (7) reinforced with aramid wire, which captures the electrical signal generated by external corrosion through the electrodes (sensors—2) positioned on the insulating element (1) and covered by the permo-porous material (5), and this whole set, which is installed on the surface of the pipeline completely surrounded by the sealing barrier (3) and, finally, the entire set covered with composite material (6).

The corrosion can be monitored, in real time, on the deck of the platform, eliminating the need to mobilize a team of climbers and scaffolding to evaluate the corrosive process, which significantly reduces the number of inspection teams to evaluate corrosion in equipment such as risers.

Furthermore, the present invention simplifies planning by prioritizing the pipings (30) that must be inspected based on the information collected, in real time, through the installed sensors.

The cleaning of the piping for thickness measurement will be minimized, and should only occur if there is a need to replace the composite material.

Regarding the structural strength with the composite material, the displacement of the fiberglass fabric or other material will be easily detected by the sensors, thus avoiding the use of empirical methods for this, such as hammer blows in the repair.

The expiration date of the structural reinforcement (anti-corrosive protection) is formulated with technical criteria guaranteeing the life of the pipe, in which the date is controlled in real time by the installed sensing system.

EXAMPLES

For this study, the following tests were performed, which represent examples of the steps of grounding of the present invention.

Example 1: Analysis of the Corrosive Process Acting on the TVZ

This study was addressed to understand the mechanism of the external corrosive process, acting in the pipelines located in the TVZ. Multidisciplinary studies were carried out, addressing to the mechanisms of corrosion of different origins. Metallurgical, electrochemical, physical-chemical and thermodynamic processes were studied in detail in order to define which process best characterizes the corrosion mechanisms in the TVZ environment.

Figure 1:
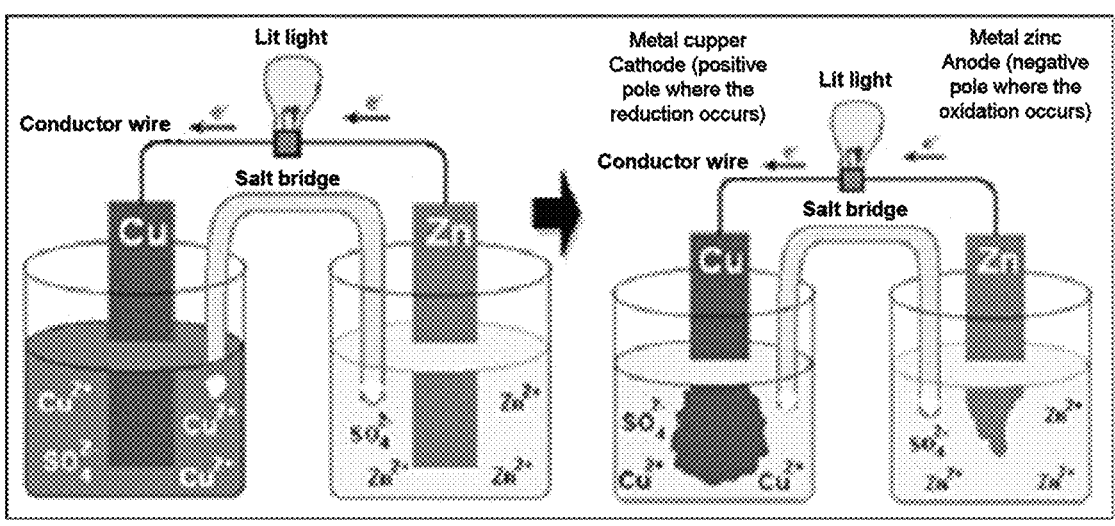
FIG. 1 illustrating a schematic of a Daniell electrochemical cell.

The result of this research concluded that the electrochemical model or Daniell cell (1836) is the one that best represents this corrosion environment, as illustrated in FIG. 1. It further supports the concept of corrosion—destruction or deterioration of a material due to chemical or electrochemical action with the medium.

The Daniell cell shows that it is possible to detect corrosion by ion exchange between the cathode and anode in an aqueous environment (electrolyte), with low voltage electric current generation: 0.75 V. This model was simulated in a specimen (CP) (20), configured with all the parameters of the galvanic cell, so that it was possible to capture the electrical signal generated by the corrosion.

Example 2:—Engineering of the Corrosion Detection System in the TVZ Environment Having defined the model of the electrochemical process of corrosion, the next step was to engineer a specimen (CP) (20) to simulate the Daniell galvanic cell.

Thus, a CP was built with the same material used in the TVZ pipelines (API-5LX-60), and in analogy to the galvanic cell some assumptions were considered, namely, (1) the presence of corrosion is evidenced when the electrical circuit closes between the two electrodes, induced by the electrolyte (sea air); (2) thus, low voltage (0.75 V) is generated, which must be captured through an electronic-electrical device positioned on the surface; (3) the two electrodes must be isolated from the pipeline wall, so as not to have the circuit closed without the presence of the electrolyte; (4) the electrodes must be protected against the action of the sea air (electrolyte); (5) the protection material for the corroded area and for the electronic-electrical set must be inert, impermeable to water, oxygen and bacterial action and withstand temperatures of up to 90° C.; (6) the beginning of corrosion, caused by the invasion of electrolyte due to failure in the pipeline protection system, will be immediately indicated through light signals displayed on electronic panels, positioned on the PU deck.

Example 3: Simulation of Premises

Initially, a simulation was performed to evaluate the effectiveness of the product used as a sealing barrier between the pipeline and the environment.

Figure 2:
FIG. 2 illustrating a specimen (CP) prepared with almost white metal completely involved by the moisture inhibitor product, for testing the sealing barrier.

FIG. 2 shows the CP prepared to the almost-white metal that was completely involved by the moisture inhibitor product. This environmentally friendly material is widely used in the Netherlands to waterproof canals, which is available on the market.

Simulating the electrolyte, a porous and permeable element (white material) containing crystallized sugar was placed. The expectation would be, in case of inhibitor failure, that the water where the CP was submerged would percolate the inhibitor and dissolve the sugar. That said, the whole set was immersed in water for 72 hours. After this period, the CP was removed from the water to evaluate the conditions of the porous element containing sugar.

As can be seen in FIG. 2, the porous element showed no evidence of moisture and the sugar was perfectly friable. It is concluded that the moisture inhibitor is effective, thus meeting premise (5) as mentioned above.

Example 4: Galvanic Cell

Figure 3:
FIG. 3 illustrating the assembly of a galvanic cell, in which the CP shown includes all the constituents of the cell.

In this step, the galvanic cell was assembled, as shown in FIG. 3, which shows the CP with all the constituent elements of the cell.

The top of the CP comprises an electrical source, conductors with LED, and electronic components.

The body of the CP comprises a sealing barrier material, a permo-porous element, an insulating material and electrodes.

The sealing barrier, made of viscoelastic material, easily molded, is fragile, the reason why it must be protected from mechanical shocks—dark material, on the right, at the base of the CP.

The permo-porous element is fundamental in the composition of the system for providing the capture of a minimum amount of electrolyte to close the electrical circuit, indicative of corrosion. It further prevents the accumulation of electrolyte around the electrodes, due to surface tension, giving rise to the formation of an aqueous body in the form of a lemniscate, generating punctual corrosion and without actuating the electrical circuit.

Example 5: Electronic System Design

At this step, an electronic system was designed to capture the voltage of 0.75 V, product of the corrosive reaction and powered by a source of 125 V and/or 220 V. The system was simulated on a protoboard, as shown in FIG. 5.

As can be seen in FIG. 4, which shows all the components of the system, energized with a source of 127 V, conductor cable (white) connected to the galvanic cell (sensor) and the LED on, indicating the detection of the voltage of 0.75 V.

Example 6: Field Test of the Corrosion Monitoring System

A CP was assembled with all the system components and immersed in a container containing salt water for 72 hours, simulating the TVZ environment, as shown in FIG. 5.

During the entire test period, the system did not alarm, that is, the LED did not light up. In this way, it would not be possible to evaluate whether there was a failure in the configuration of the set or whether the blockage was effective, preventing the penetration of moisture (electrolyte), saturating the salt bridge and, consequently, generating electrical voltage. Thus, a sodium chloride saline solution was induced in the set in the expectation of forming the salt bridge. Immediately the LED lit up, as shown in FIG. 6. Thus, the effectiveness of the Corrosion Detection System (CDS) was confirmed.

The results of this simulation showed that it is possible to detect, immediately, the beginning of the corrosive process through the electrical signal. The most important thing is that by keeping the system energized, we can uninterruptedly monitor the action of corrosion at various points in the piping.

Thus, two prototypes of the External Corrosion Monitoring System (CMS) were built in steel pipelines located in the tidal variation zone (TVZ) for field application.

As can be seen, FIG. 7 represents the turned off electronic panel with the set of five sensors, and FIG. 8 shows the same panel, but energized (LED on) indicating that the system is active. When there is active corrosion activity, the panel will indicate in which sensor the corrosive process is occurring, FIG. 9.

The panels are placed in a compartment on the platform, preferably protected from sunlight. The electronic system is housed in a watertight box protected from moisture. At the bottom of the panel, there are two entrances to receive the conductors connected to the sensors, these latter positioned at previously defined points of the pipeline.

As can be seen, the application of this technology involves several steps, all intrinsically linked to each other, which requires well-trained workforce to apply the CMS.

The invention applied in a pipeline is shown in detail in FIGS. 11 and 12. The assembly sequence is as follows, starting from the pipeline:

a.—place an insulating element (1), b.—the sensors (2) and/or sensor collar (4) are placed on the insulating element and connected to the respective cables (7), c.—the permo-porous material (5) is placed over the sensors, d.—an anti-corrosive protection is applied to this entire set (3) and, finally, covering all these elements, e.—a layer of composite material (6) is applied to protect the system.

It should be noted that, although the present invention has been described in relation to the attached drawings, it may undergo modifications and adaptations by technicians skilled on the subject, depending on the specific situation, but as long as it is within the inventive scope defined herein.

The invention claimed is:

1. A corrosion remote monitoring system, configured to be used on a pipeline located in a tidal variation zone (TVZ), the system comprising:

at least one sensor electrode assembly comprising:

an insulating element configured to be disposed on an external surface of the pipeline;

a pair of sensor electrodes disposed over the insulating element, a first sensor electrode of the pair of sensor electrodes spaced apart from a second sensor electrode of the pair of sensor electrodes on the insulating element;

a permo-porous material covering the pair of sensor electrodes;

a sealing barrier configured to completely cover the permo-porous material, the pair of sensor electrodes, and the insulating element; and a composite material completely covering the sealing barrier;

an electronic panel comprising five electrical sensors, each electrical sensor electrically connected to a LED;

at least one conductor cable reinforced with aramid wire; and an electrical source;

wherein each conductor cable electrically connects one of the at least one sensor electrode assembly to one of the five electrical sensors on the electronic panel, and the electrical source;

wherein each conductor cable is configured to capture an electrical signal generated by external corrosion through the pipeline via the one of the at least one sensor electrode assembly; and wherein each LED is configured to light up when the electrical signal from each conductor cable is detected in one of the five electrical sensors on the electronic panel.

2. The corrosion remote monitoring system according to claim 1, wherein the pipeline comprises risers, JTubes, or I-Tubes.

3. The corrosion remote monitoring system according to claim 1, wherein the at least one sensor electrode assembly comprises five sensor electrode assemblies.

4. The corrosion remote monitoring system according to claim 3, wherein the five sensor electrode assemblies are configured to be spaced apart from each other on the external surface of the pipeline.

5. The corrosion remote monitoring system according to claim 1, wherein the sealing barrier comprises a viscoelastic material.

6. The corrosion remote monitoring system according to claim 1, further comprising a watertight box, wherein the electronic panel is disposed in the watertight box.

7. The corrosion remote monitoring system according to claim 1, further comprising a sensor electrode collar placed over the insulating element.

* * * * *